United States Patent
Yamamoto (10) Patent No.: US 7,232,092 B2
(45) Date of Patent: Jun. 19, 2007

(54) FLYING VEHICLE-LAUNCHING APPARATUS AND METHOD

(75) Inventor: Masatada Yamamoto, Nagoya (JP)

(73) Assignee: Central Japan Railway Company, Nakamura-ku, Nagoya-shi, Aichi-ken (JP)

( * ) Notice: Subject to any disclaimer, the term of this patent is extended or adjusted under 35 U.S.C. 154(b) by 0 days.

(21) Appl. No.: 10/921,263

(22) Filed: Aug. 18, 2004

(65) Prior Publication Data

US 2005/0082424 A1    Apr. 21, 2005

(30) Foreign Application Priority Data

Oct. 20, 2003    (JP) ............................. 2003-359180

(51) Int. Cl.
*B64F 1/04*        (2006.01)

(52) U.S. Cl. ....................................... 244/63

(58) Field of Classification Search ................. 244/63, 244/64, 65, 66, 154, 904, 147, 148, 149; 446/63, 64, 65; 294/904
See application file for complete search history.

(56) References Cited

U.S. PATENT DOCUMENTS

| | | | | |
|---|---|---|---|---|
| 1,541,579 A | * | 6/1925 | Kikta | 446/65 |
| 1,765,210 A | * | 6/1930 | Daniel | 244/63 |
| 2,017,778 A | * | 10/1935 | Vido | 124/26 |
| 2,327,702 A | * | 8/1943 | Flynt | 446/63 |
| 2,404,960 A | * | 7/1946 | Hanson et al. | 290/4 R |
| 2,404,963 A | * | 7/1946 | Jones et al. | 244/63 |
| 2,404,964 A | * | 7/1946 | Jones | 290/41 |
| 2,404,984 A | * | 7/1946 | Powers | 104/290 |
| 2,412,512 A | * | 12/1946 | Jones et al. | 318/135 |
| 2,413,724 A | * | 1/1947 | Maxson et al. | 244/63 |
| 2,428,570 A | * | 10/1947 | Jones | 310/13 |
| 2,485,601 A | * | 10/1949 | Hickman | 244/63 |
| 2,519,253 A | * | 8/1950 | Jones | 318/135 |

(Continued)

FOREIGN PATENT DOCUMENTS

GB        211155 A        6/1989

(Continued)

OTHER PUBLICATIONS

Office Action dated Oct. 3, 2006 in the related Japanese Application No. 2003-359180, with translation.

*Primary Examiner*—Teri Pham Luu
*Assistant Examiner*—Stephen A Holzen
(74) *Attorney, Agent, or Firm*—Thelen Reid Brown Raysman & Steiner LLP (57) ABSTRACT

A flying vehicle-launching apparatus and method for launching a winged flying vehicle by accelerating the vehicle in a predetermined direction includes a flying vehicle-supporting platform, a guide device, and a driving device. The flying vehicle-supporting platform supports the winged flying vehicle so that it can lift off therefrom. The guide device supports the flying vehicle-supporting platform across two or more separated and parallel guide ways and guides the flying vehicle-supporting platform along the guide ways.

In the flying vehicle-launching method, a propulsive engine of the winged flying vehicle is started after initiating acceleration with a flying vehicle-accelerating device. The winged flying vehicle is released from the flying vehicle-accelerating device in a predetermined angle of attack that is positive to a direction of acceleration after reaching a predetermined velocity.

7 Claims, 11 Drawing Sheets

U.S. PATENT DOCUMENTS

| | | | |
|---|---|---|---|
| 2,611,355 A * | 9/1952 | Ashwood | 124/26 |
| 2,666,879 A * | 1/1954 | Gosdey, Jr. et al. | 318/135 |
| 2,708,431 A * | 5/1955 | Walker | 124/22 |
| 2,734,702 A * | 2/1956 | Northtop | 244/63 |
| 2,862,682 A * | 12/1958 | Davies | 244/63 |
| 3,113,398 A * | 12/1963 | Merritt | 446/63 |
| 3,126,880 A * | 3/1964 | Loe | 124/22 |
| 3,392,937 A * | 7/1968 | Riblett, Jr. | 244/63 |
| 3,408,768 A * | 11/1968 | Glass et al. | 446/65 |
| 3,496,671 A * | 2/1970 | Korona | 446/50 |
| 3,603,024 A * | 9/1971 | Davis et al. | 446/65 |
| 3,771,462 A * | 11/1973 | Barthalon et al. | 104/290 |
| 3,905,350 A * | 9/1975 | Becker | 124/17 |
| 3,968,947 A * | 7/1976 | Schlegel et al. | 244/63 |
| 4,014,246 A * | 3/1977 | Nissley, Jr. | 89/1.819 |
| 4,060,930 A * | 12/1977 | Hirtle et al. | 446/65 |
| 4,079,901 A * | 3/1978 | Mayhew et al. | 244/63 |
| 4,155,194 A * | 5/1979 | Amamoto et al. | 446/65 |
| 4,209,937 A * | 7/1980 | Witte | 446/63 |
| 4,238,093 A * | 12/1980 | Siegel et al. | 244/63 |
| 4,329,808 A * | 5/1982 | Rich et al. | 446/62 |
| 4,350,316 A * | 9/1982 | Thomas | 244/63 |
| 4,709,883 A * | 12/1987 | Giuliani et al. | 244/63 |
| 4,795,113 A * | 1/1989 | Minovitch | 244/63 |
| 4,909,458 A * | 3/1990 | Martin | 244/63 |
| 5,395,275 A * | 3/1995 | Johnson et al. | 446/60 |
| 5,433,641 A * | 7/1995 | Rudell et al. | 446/28 |
| 6,457,673 B1 * | 10/2002 | Miller | 244/63 |
| 6,626,399 B2 * | 9/2003 | Young et al. | 244/63 |
| 6,851,647 B1 * | 2/2005 | Rosenbaum et al. | 244/63 |
| 6,952,086 B1 * | 10/2005 | Krefta et al. | 318/135 |
| 2003/0116677 A1 * | 6/2003 | Young et al. | 244/63 |
| 2005/0082424 A1 * | 4/2005 | Yamamoto | 244/63 |
| 2005/0115454 A1 * | 6/2005 | Ramu | 104/281 |
| 2005/0178894 A1 * | 8/2005 | McGeer et al. | 244/63 |
| 2005/0178895 A1 * | 8/2005 | McGeer et al. | 244/63 |
| 2005/0230533 A1 * | 10/2005 | Lipponen | 244/63 |

FOREIGN PATENT DOCUMENTS

| | | |
|---|---|---|
| JP | 57-130899 | 8/1982 |
| JP | 2861569 | 7/1993 |
| JP | 08-011795 | 1/1996 |
| JP | 2003-170900 | 6/2003 |
| WO | WO 96/15941 | 5/1996 |

\* cited by examiner

FLYING VEHICLE-LAUNCHING APPARATUS AND METHOD

CROSS-REFERENCE TO RELATED APPLICATION

This application claims priority under 35 U.S.C. 119 to Japanese Patent Application No. 2003-359180, the disclosure of which is incorporated by reference herein.

BACKGROUND OF THE INVENTION

1. Field of the Invention

The present invention relates to an apparatus and method for launching a winged flying vehicle, especially, an apparatus and method suitable for horizontally launching a flying vehicle such as a spacecraft.

2. Description of the Related Art

Vertically launched rockets such as those used with the Space Shuttle are commonly known as flying vehicles used for space travel. However, vertically launched spacecraft are considered uneconomical in that fuel occupies a large portion of the spacecraft lift-off weight and furthermore, it is difficult to reuse the fuselage.

Therefore, spacecraft that take off and land horizontally like a common aircraft have recently been attracting attention since such spacecraft are thought to be more economical than the current rocket version. This is due to the fact that the fuel load can be reduced and the fuselage easily reused. Different types of horizontal launching methods for spacecraft have been proposed in order to make spacecraft more economical by further reducing the fuel load.

The following methods and apparatuses for horizontal launching have been proposed:

(1) One proposal involves an accelerating apparatus comprising a carriage for carrying a spacecraft, wherein the carriage is guided along a track. The carriage has a jet engine, and thrust is generated by irradiating a propellant with a laser ray. There is a laser ray-introducing portion that receives a laser ray from the forward direction, and the track has laser-irradiating equipment provided halfway at the track and the laser-irradiating equipment irradiates the laser ray-introducing portion (see Japanese Patent Publication No. 2861569, referred to as 'the first related art' hereinafter).

(2) Another proposal involves a glider-type space-launched aircraft that is towed by an aircraft (International Patent Publication WO96/15941, referred to as 'the second related art' hereinafter).

In the accelerating apparatus described in the first related art, the carriage is accelerated by a certain accelerating device, however, it is difficult to smoothly accelerate the spacecraft unless the direction of acceleration of the carriage is exactly identical to the direction of thrust of the rocket engine of the spacecraft. Furthermore, there is also the risk of carriage derailment. Additionally, there is the possibility of the carriage and the jet engine being damaged when the rocket engine of the spacecraft is started at the same time as the start of acceleration. Notwithstanding this fact, there is no description in the related art regarding appropriate timing for starting the rocket engine in order to prevent damage of the carriage and the jet engine. In this regard, high-temperature exhaust gas discharged from the jet engine can also damage the track or other structures.

With a spacecraft that is towed by an aircraft to climb to a specific altitude, such as the glider-type space-launched aircraft described in the second related art, it is extremely difficult to retrieve the spacecraft. This is especially the case when combustion proceeds abnormally in the rocket engine of the spacecraft after release from the towing aircraft, and it is difficult to safely land the spacecraft at an airfield. Additionally, the aircraft has to be large in order to be able to tow the spacecraft, making a long runway necessary in order for both the aircraft and the spacecraft to takeoff.

SUMMARY OF THE INVENTION

The present invention has been made in view of the above circumstances and provides a flying vehicle launching apparatus and method by which a spacecraft can be accelerated safely and efficiently.

A first aspect of the present invention is a flying vehicle-launching apparatus that launches a winged flying vehicle by accelerating the winged flying vehicle in a predetermined direction. The apparatus comprises a flying vehicle-supporting platform that supports the winged flying vehicle such that the winged flying vehicle can launch therefrom. A guide device that supports the flying vehicle-supporting platform over two or more guide ways while guiding the flying vehicle-supporting platform along the guide ways is provided, the guide ways being provided in parallel and separated from each other. The present invention also includes a driving device that drives the flying vehicle-supporting platform along the guide ways.

A second aspect of the present invention is a flying vehicle-launching method for accelerating a winged flying vehicle in a specific direction with a flying vehicle-accelerating means. A propulsive engine of the winged flying vehicle is started after initiating acceleration of the winged flying vehicle with the flying vehicle-accelerating means. The winged flying vehicle is released while being tilted in a predetermined positive angle of attack relative to a direction of acceleration from the flying vehicle-accelerating means after being accelerated to a predetermined velocity.

DESCRIPTION OF THE PREFERRED EMBODIMENTS

In the present flying vehicle-launching apparatus, the winged flying vehicle is accelerated with a driving device such as a linear motor and thus, the flying vehicle-accelerating apparatus of the present invention can be easily adapted for unmanned operation, and operates safely even when the engine of the winged flying vehicle explodes during acceleration. Further, since the driving device can not only accelerate but also decelerate a flying vehicle-supporting platform to a halt, the winged flying vehicle can be safely slowed down to a halt when the propulsive engine of the winged flying vehicle malfunctions.

Unless the propulsive engine of the winged flying vehicle supported by the flying vehicle-supporting platform generates thrust in a direction identical to that of the thrust of the driving device, an imbalance load in a yaw direction is generated when the propulsive engine is activated. However, guide devices are provided bilaterally, i.e., on both sides of the flying vehicle-supporting platform, to support the flying vehicle-supporting platform. The guide devices are disposed in or on the guide ways parallel to and separated from each other. The winged flying vehicle can thus be smoothly accelerated even when imbalance load in a yaw direction is generated due to a difference of a thrust direction between the propulsive engine of the winged flying vehicle and the driving device of the flying vehicle-accelerating apparatus of the present invention.

The winged flying vehicle described herein is a spacecraft, however, the present invention is not limited to spacecraft only. The winged flying vehicle may be any flying vehicle capable of flying in the air by generating lift.

The flying vehicle-supporting platform can be any platform supporting a winged flying vehicle so that the winged vehicle can takeoff therefrom. Therefore, the flying vehicle-supporting platform of the present invention includes not only a platform on which the winged flying vehicle is mounted but also a platform from which the winged flying vehicle is slung or suspended.

The winged flying vehicle is preferably supported by the flying vehicle-supporting platform so that the winged flying vehicle is released while slanted at a predetermined angle of attack positive to the travelling direction of the flying vehicle-supporting platform after being accelerated to a predetermined velocity.

In the above-mentioned flying vehicle-launching apparatus, when the winged flying vehicle is released from the above-mentioned flying vehicle-supporting platform with a velocity vector slanted upwardly relative to the travelling direction of the flying vehicle-supporting platform, while the flying vehicle-supporting platform continues travelling with a substantially horizontal velocity vector. Consequently, the winged flying vehicle runs on the flying vehicle-supporting platform to depart therefrom. Therefore, when the flying vehicle-supporting platform is a platform on which the winged flying vehicle is mounted, the winged flying vehicle can be released by only running on the flying vehicle-supporting platform. When the winged flying vehicle is slung under the flying vehicle-supporting platform, the winged flying vehicle can be released by disengaging therefrom. Accordingly, it is only necessary to dispose a simple engaging device on the flying vehicle-supporting platform for preventing the winged flying vehicle from falling off and therefore, a special releasing device such as a catapult is not required, thus drastically simplifying the construction of the flying vehicle-supporting platform.

Since it is only necessary for the flying vehicle-supporting platform to release the winged flying vehicle in a position where the vehicle is tilted at an angle of attack that is positive to the travelling direction, the present invention is not limited to a platform that holds the winged flying vehicle in a predetermined angle of attack from the beginning of acceleration. It is also possible to employ a platform where the winged flying vehicle is held horizontally at the beginning and then raised to a predetermined angle of attack during acceleration. Similarly, a platform that raises the winged flying vehicle after starting the propulsive engine thereof and just before release may also be employed.

The most preferable embodiment of the flying vehicle-supporting platform is a platform that supports the winged flying vehicle in an inclined or slanted position relative to the direction of acceleration, both when at a standstill and during acceleration.

In the above embodiment of the flying vehicle-supporting platform, a mechanism for tilting or inclining the winged flying vehicle supported thereon to a predetermined angle of attack during acceleration or just before releasing is not required. For this reason, a platform supporting the winged flying vehicle at a predetermined angle of attack, and having a remarkably simple construction, can be employed as the flying vehicle-supporting platform.

The flying vehicle-launching apparatus of the present invention preferably has a track serving as the guide way and a carriage travelling along the track that functions as the guide device. A winged flying vehicle can be accelerated along an accurate path by the above flying vehicle-launching apparatus since the flying vehicle-supporting platform thereof is guided by the carriage travelling along the track. Additionally, the flying vehicle-supporting platform can be safely slowed to a halt.

The driving device includes a linear motor, which will be described later, consisting of a stator fixed on the track and an armature fixed on a carriage as well as a carriage having an electric motor and wheels operated thereby. Among the above usable driving devices, a linear motor having a stator fixed on the track and an armature fixed on the carriage is most preferable.

Unlike a common railway system, a linear motor system has no limitation of acceleration determined by an adhesive coefficient between a rail and a wheel rolling thereon. Accordingly, acceleration of the flying vehicle-supporting platform can be determined in accordance with the length of the tracks and the required velocity at which the winged flying vehicle is to be released. Additionally, by using a magnetic levitating system that utilizes a linear motor for levitation and propulsion as the driving device, the carriage portions can be supported and guided without contacting the track.

Each carriage portion preferably has two or more truck groups disposed in line along the travelling direction of the flying vehicle-launching apparatus of the present invention. Each truck group is preferably provided under the flying vehicle-supporting platform so as to pivot around a horizontal axis that is perpendicular to the travelling direction thereof.

The height of a drag center of the winged flying vehicle supported by the flying vehicle-supporting platform is higher than that of the trucks under the flying vehicle-supporting platform and thus, momentum load is generated at the flying vehicle-supporting platform. Nonetheless, the momentum load is borne equally by each truck constituting the truck groups since each truck group is supported pivotally around a single point. Accordingly, acceleration proceeds smoothly even after starting the propulsive engine of the winged flying vehicle.

Additionally, during acceleration, it is preferably determined whether the propulsive engine is operating normally. If the propulsive engine is operating normally, the winged flying vehicle is released from the flying vehicle-supporting platform when the flying vehicle-supporting platform reaches a predetermined speed. On the other hand, if the propulsive engine is not operating normally, the flying vehicle-supporting platform is slowed to halt with the winged flying vehicle supported thereon.

The winged flying vehicle can be launched especially reliably and safely by the above embodiment of the flying vehicle-launching apparatus since determination on the condition of the propulsive engine of the winged flying vehicle is carried out and if the determination is negative, the flying vehicle-supporting platform is slowed to a halt without launching the winged flying vehicle. Further, the propulsive engine of the winged flying vehicle can be ignited after starting acceleration with the driving device while adjusting the thrust from the driving device so that the winged flying vehicle is accelerated in accordance with a predetermined acceleration pattern.

The above embodiment of the flying vehicle-launching device has excellent safety and is easily adapted to unmanned operation since the winged flying vehicle is accelerated only by the driving device just after acceleration is started.

In addition, by adjusting or controlling the thrust of the driving device during acceleration in accordance with a predetermined acceleration pattern, the winged flying vehicle can be accelerated at different acceleration patterns. Examples include an acceleration pattern where the winged flying vehicle is accelerated at an even rate of acceleration, and an acceleration pattern where the winged flying vehicle is accelerated so that no horizontal load is applied to the flying vehicle-supporting platform after ignition of the propulsive engine. Further, even a winged flying vehicle having a solid propellant rocket engine as the propulsive engine, the thrust of which is almost impossible to control, can be accelerated at a predetermined acceleration pattern by controlling the thrust of the driving device.

The driving device preferably accelerates the winged flying vehicle so that the winged flying vehicle is accelerated at a thrust equal to the difference between the acceleration resistance generated when the winged flying vehicle is accelerated at a specific acceleration and the thrust of the propulsive engine of the winged flying vehicle after ignition thereof.

By the above embodiment of the flying vehicle-launching apparatus of the present invention, the winged flying vehicle can be accelerated at a predetermined rate of acceleration and additionally, load applied to the flying vehicle-supporting platform can be reduced since a thrust equal to the difference between the acceleration resistance and the thrust of the propulsive engine is applied to the vehicle-supporting platform of the flying vehicle-launching apparatus. The acceleration resistance is a resistance generated at a flying vehicle-supporting platform supporting the winged flying vehicle when accelerating the flying vehicle-supporting platform at a specific rate of acceleration.

The flying vehicle-launching apparatus of the present invention can comprise an exhaust gas-discharging interspace disposed between the guide ways for discharging combustion exhaust gas from the winged flying vehicle.

High-temperature and high-pressure exhaust gas discharged from the propulsive engine of the winged flying vehicle escapes rearward through the exhaust gas-discharging interspace. Thus, damage of structures, such as the flying vehicle-supporting platform or the guide ways, by the exhaust gas can be prevented. An example of the above-mentioned exhaust gas-discharging interspace includes a combustion exhaust gas-discharging interspace provided between the guide ways.

In the above embodiment of the flying vehicle-launching apparatus of the present invention, exhaust gas blast from the propulsive engine of the winged flying vehicle is discharged into the combustion exhaust gas-discharging interspace. Consequently, it is not necessary for the flying vehicle-supporting platform to be set high for avoiding the exhaust gas blast and therefore, can be made as low as possible. Accordingly, the above embodiment is preferable in that a momentum load generated by a difference of the heights of aerodynamic drag center between the winged flying vehicle and the carriages of the flying vehicle-supporting platform can be reduced. The combustion exhaust gas-discharging interspace is not necessarily disposed along the whole length of the guide ways but only at a section where the propulsive engine operates.

In the flying vehicle-launching method of the present invention, a winged flying vehicle is firstly accelerated by a driving means such as a linear motor and then, the propulsive engine is started when the winged flying vehicle is accelerated to a certain extent and thus, the flying vehicle-launching method of the present invention is easily adapted to unmanned operation. Additionally, there is no harm when an accident such as an explosion of the propulsive engine occurs during acceleration of the winged flying vehicle. Further, since the winged flying vehicle is released from a flying vehicle-accelerating means in a slanting position at an angle of attack that is positive to the acceleration direction, the winged flying vehicle is released with a velocity vector having a direction that is slanted upward relative to the traveling direction while the flying vehicle-supporting platform itself has a horizontal velocity vector. Thus, the winged flying vehicle can be released simply by disengaging the engagement with the flying vehicle-supporting platform of the flying vehicle-accelerating means. Accordingly, it is not necessary to equip the flying vehicle-supporting platform with a releasing apparatus such as a catapult for releasing the winged flying vehicle.

In the flying vehicle-launching method of the present invention, acceleration of the winged flying vehicle can be started with the winged flying vehicle held at an acute angle against an acceleration direction. The flying vehicle-supporting platform used in the above flying vehicle-accelerating method can be a platform holding the winged flying vehicle at a specific positive angle of attack. Thus, there is no necessity for a mechanism that tilts the winged flying vehicle from a horizontal position to a specific angle of attack when releasing the winged flying vehicle. Accordingly, the construction of the flying vehicle-supporting platform can be drastically simplified.

Additionally, in the above flying vehicle-launching method, the thrust of the flying vehicle-accelerating means can be controlled so that the winged flying vehicle is accelerated with a predetermined acceleration pattern after starting the propulsive engine thereof.

In the above-mentioned flying vehicle-launching method, by controlling the thrust of the driving means of the flying vehicle-accelerating means, the winged flying vehicle can be accelerated in different acceleration patterns. Additionally, although thrust control is almost impossible when the propulsive engine of the winged flying vehicle is a solid fuel rocket engine, the winged flying vehicle can be accelerated at a predetermined acceleration pattern by controlling the thrust of the driving means.

Further, after starting ignition of the propulsive engine of the winged flying vehicle, the thrust of the flying vehicle accelerating apparatus is preferably controlled to be equal to the difference between the thrust of the propulsive engine of the winged flying vehicle and the acceleration resistance of the winged flying vehicle accelerated at a predetermined rate of acceleration.

By controlling the thrust of the flying vehicle accelerating apparatus as described in the above, the winged flying vehicle can be accelerated at a predetermined rate of acceleration as well as a load applied to a flying vehicle-supporting platform of the flying vehicle-launching means can be reduced.

A flying vehicle-launching apparatus of the present invention can be utilized as the flying vehicle-accelerating means mentioned in the above.

By releasing the winged flying vehicle by using the flying vehicle-supporting platform as a runway, the vehicle can be released without any releasing device such as a catapult disposed on the flying vehicle-supporting platform, thus drastically simplifying the construction of the platform.

In the flying vehicle-launching method of the present invention, during the time from the start of the propulsive engine to the release of the winged flying vehicle, it is preferably determined whether the propulsive engine is operating normally. If the propulsive engine is operating normally, the winged flying vehicle is released from the flying vehicle-accelerating apparatus after the winged flying vehicle reaches a predetermined speed. On the other hand, if the propulsive engine is not operating normally, the winged flying vehicle is preferably slowed to a halt without being released from the flying vehicle-accelerating apparatus.

The above-mentioned flying vehicle-launching method has excellent safety and reliability since the above-mentioned determination is carried out on the operation condition of the propulsive engine and based upon the result of the determination, it is decided whether or not to launch the winged flying vehicle while acceleration is continuing. In addition, if the determination is negative, the winged flying vehicle is slowed down to a halt without being released from the flying vehicle-supporting platform and thus, the winged flying vehicle can be retrieved without any major damage even when the propulsive engine malfunctions.

Below, an embodiment of the present invention is described.

1. A First Embodiment

A horizontal launching apparatus that is an example of the flying vehicle-launching apparatus of the present invention is described below.

As shown in FIGS. 1 to 4, a horizontal launching apparatus 1000 relating to the first embodiment has a carrier device 2 carrying a spacecraft craft 100 when launching it horizontally, and a pair of tracks 4 on which the carrier device 2 travels.

The carrier device 2 has a spacecraft-supporting platform 20 and carriage portions 6A and 6B travelling along each of the tracks 4. The spacecraft-supporting platform 20 is fixed to the carriage portions 6A and 6B by frontal struts 22 and rear struts 24 so that a mounting surface of the spacecraft-supporting platform 20 on which the spacecraft 100 is mounted and a horizontal surface make an angle of attack α that is positive with a traveling direction 'a'. The angle of attack α can be determined such that the spacecraft 100 is released with certainty from the spacecraft-supporting platform 20 when acceleration of the spacecraft 100 is finished. Thus, the angle of attack α is preferably from 10 to 30 degrees.

The spacecraft-supporting platform 20 is formed so that the spacecraft 100 mounted thereon can run on the spacecraft-supporting platform 20 when launched. Additionally, if necessary, a holding device can be disposed on the spacecraft-supporting platform 20 in order to hold the spacecraft 100 so as not to drop or slip off the spacecraft-supporting platform 20 during acceleration. When the spacecraft 100 has a retractable undercarriage, a chock holding tires of the undercarriage thereof can be used for the holding device. Additionally, a hook can be disposed on the spacecraft-supporting platform 20 so as to be engaged with the spacecraft 100 during acceleration. The engagement of the hook with the spacecraft 100 is released to launch the spacecraft 100 when acceleration of the spacecraft 100 is completed.

The carriage portions 6A and 6B are provided separately and in parallel and travel on L-shaped guide ways 30A and 30B that forms the tracks 4.

Figure 1:
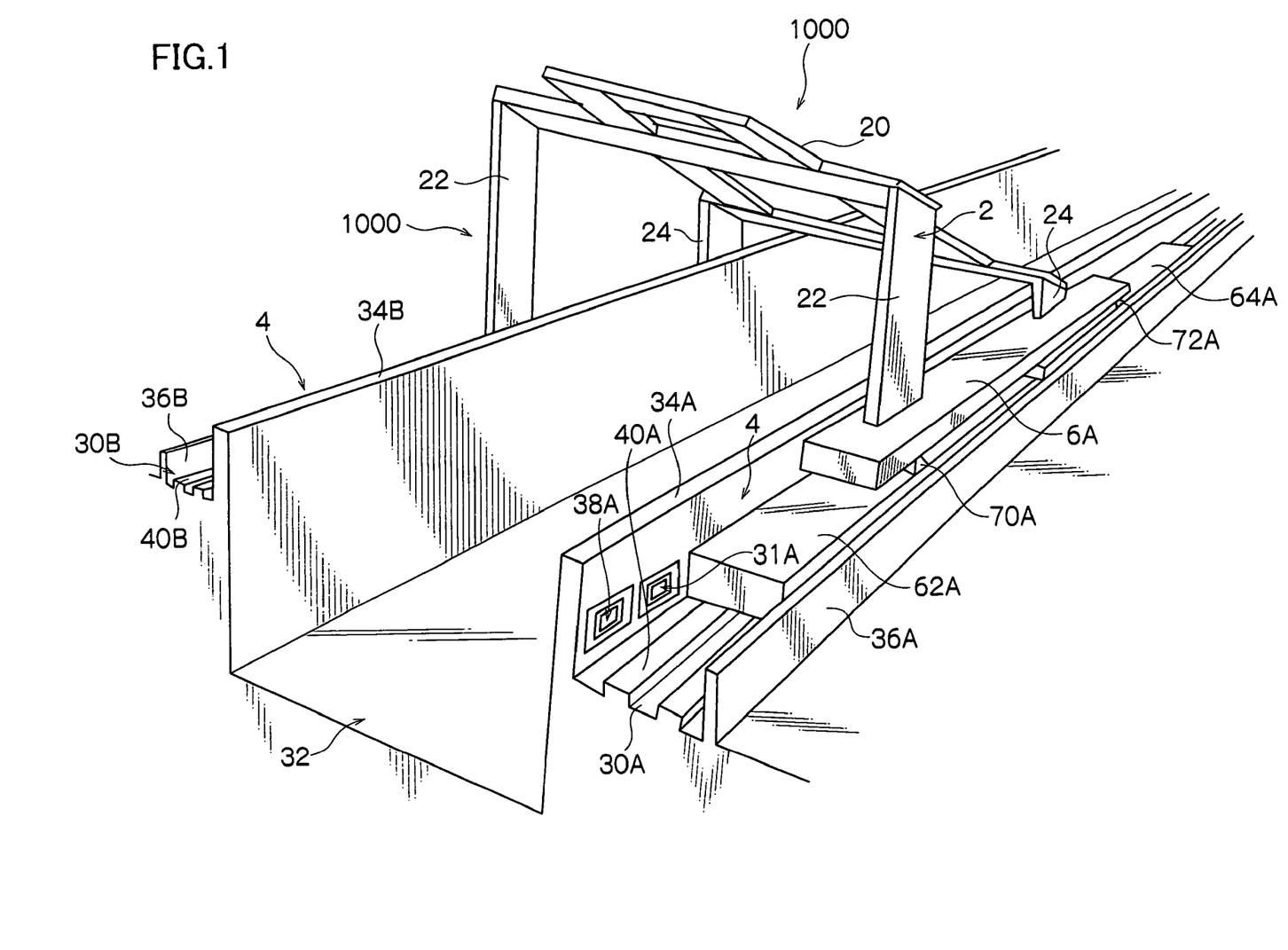
FIG. 1 is a perspective view of a horizontal launching apparatus of a first embodiment.
Figure 4:
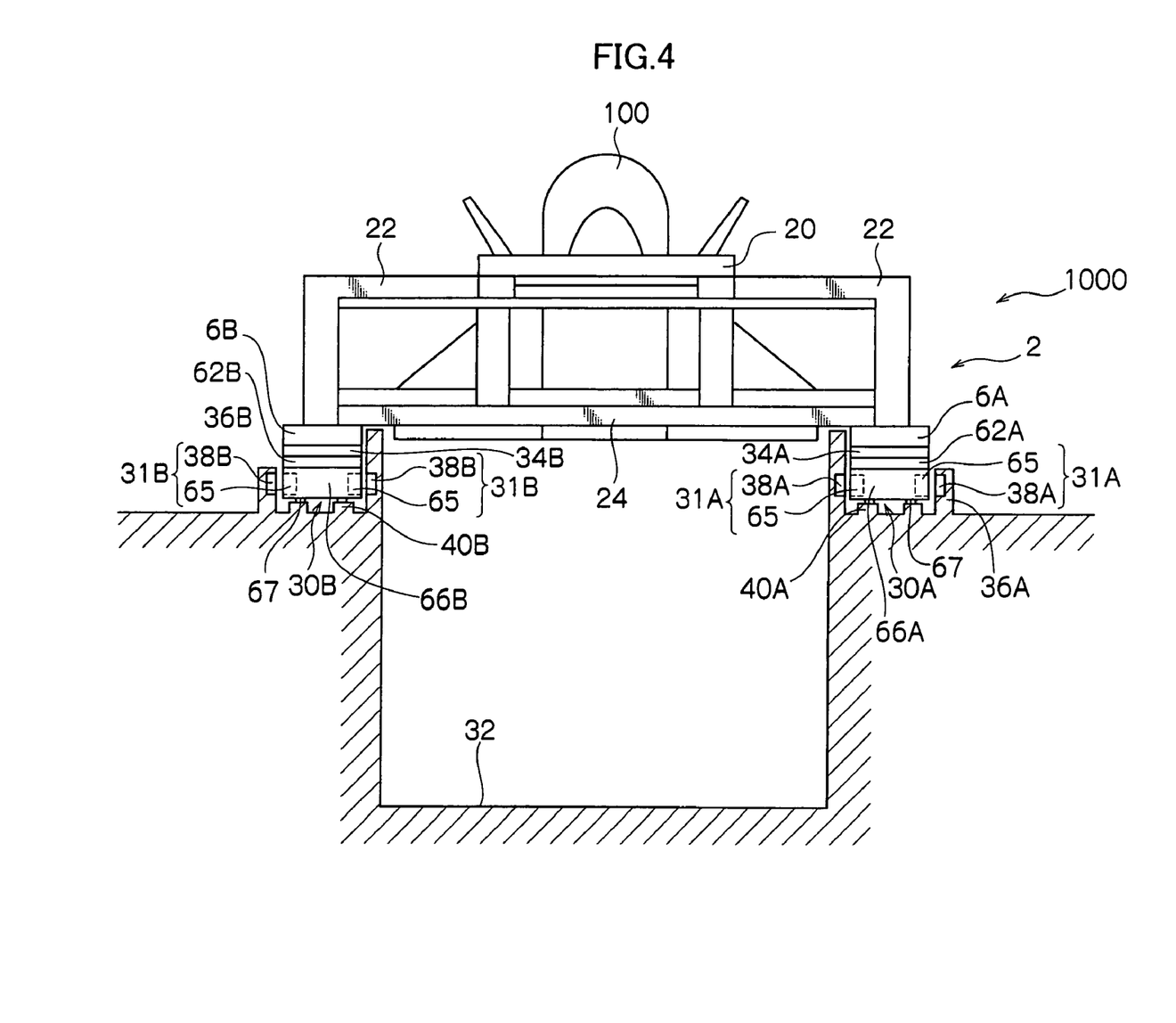
FIG. 4 is a front view of the horizontal launching apparatus of the first embodiment.
Figure 5:
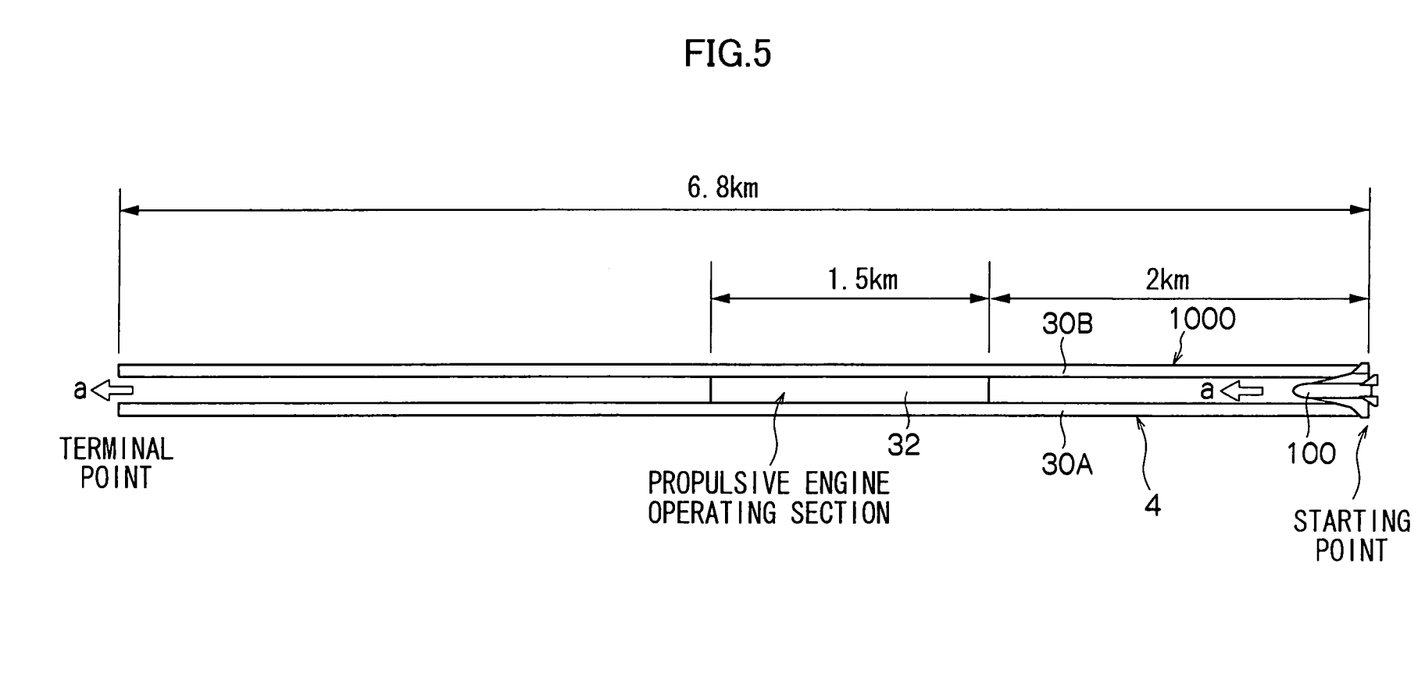
FIG. 5 is a schematic plane view showing the location of an exhaust gas channel between a pair of tracks of the horizontal launching apparatus of the first embodiment.

As shown in FIG. 5, a propulsive engine combustion section is formed at a section of the tracks 4 wherein the propulsive engine of the spacecraft 100 operates. As shown in FIGS. 1, 4 and 5, an exhaust gas-discharging interspace is provided between the L-shaped guide ways 30A and 30B at the propulsive engine combustion section. The spacecraft 100 is an example of the winged flying vehicle of the present invention and the spacecraft-supporting platform corresponds to the flying vehicle-supporting platform thereof. Further, carriage portions 6A and 6B correspond to the guide device and each track 4 corresponds to the guide ways. The exhaust gas-discharging interspace 32 corresponds to the exhaust gas-discharging interspace or ditch of the flying vehicle-launching apparatus.

Under the carriage portion 6A, a frontal truck group 62A and a rear truck group 64A are provided in tandem along the travel direction 'a'. In addition, as shown in FIGS. 2 and 3, five trucks 66A and five trucks 68A are disposed in tandem under the frontal truck group 62A and the rear truck group 64A, respectively.

Similarly, under the carriage portion 6B, a frontal truck group 62B and a rear truck group 64B are provided in tandem along the travel direction 'a'. Five trucks 66B and five trucks 68B are disposed in tandem under the frontal truck group 62B and the rear truck group 64B, respectively.

Figure 2:
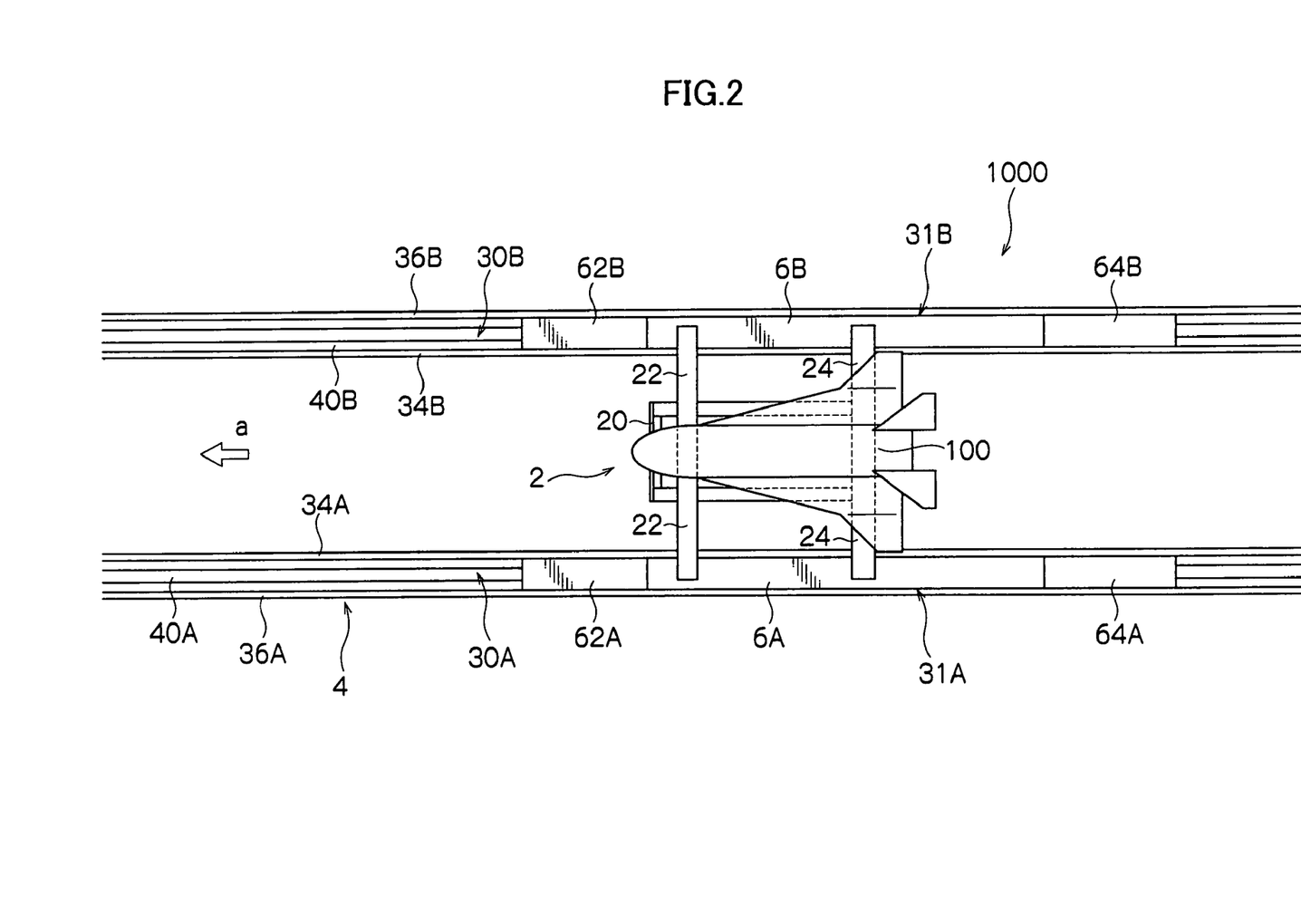
FIG. 2 is a plane view of the horizontal launching apparatus of the first embodiment.
Figure 3:
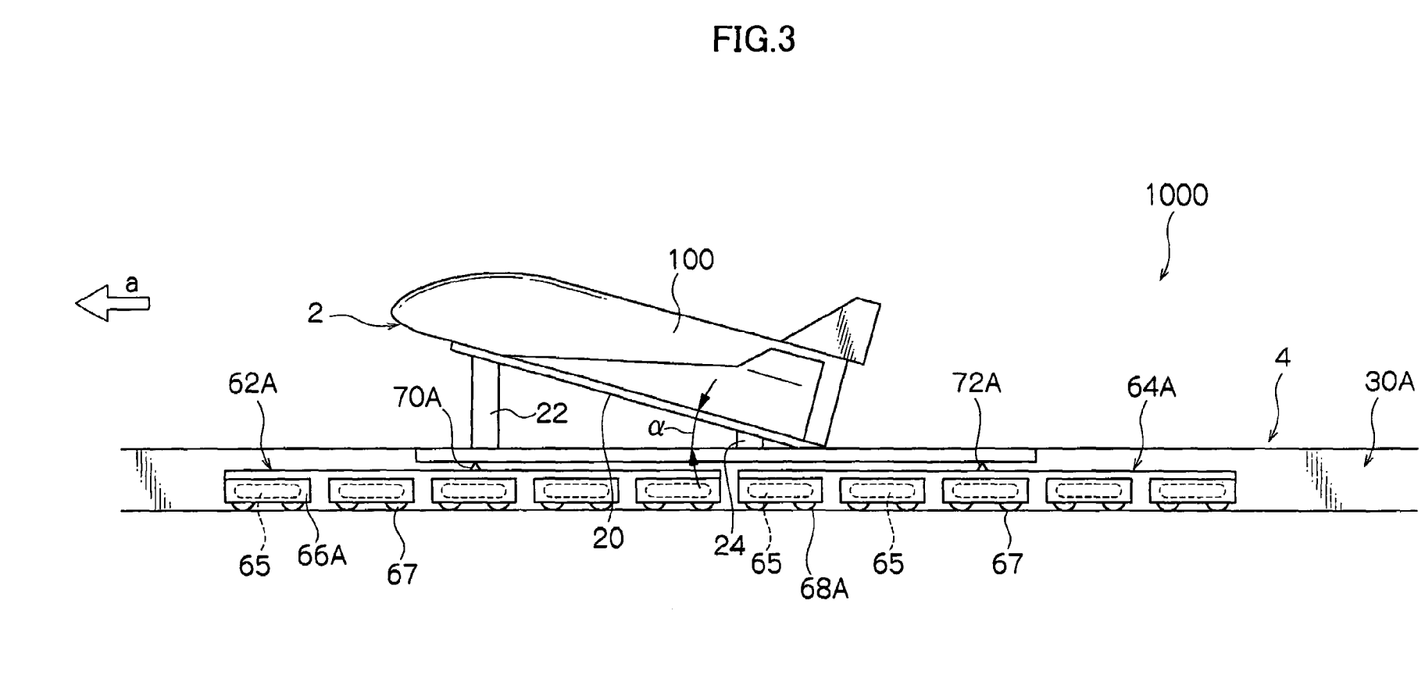
FIG. 3 is a side view of the horizontal launching apparatus of the first embodiment.

As shown in FIGS. 1 to 3, the frontal truck group 62A and the rear truck group 64A are disposed under the carriage portion 6A by pivots 70A and 72A that stretch perpendicularly to the travelling direction 'a' so as to rotate vertically. Similarly, the frontal truck groups 62A and the rear truck groups 64A are provided under the carriage portion 6A by pivots 70A and 72A stretching perpendicularly to the travelling direction 'a' so as to rotate vertically.

As shown in FIGS. 3 and 4, superconductive coils 65 are provided in the side of each of the trucks 66A, 68A, 66B and 68B. From the bottom thereof, a portion of tires 67, which are used when traveling at a low speed, are exposed.

As shown in FIGS. 1 to 3, the L-shaped guide way 30A is flanked by an inner wall 34A and an outer wall 36A. Similarly, the L-shaped guide way 30B is flanked by an inner wall 34B and an outer wall 36B. Ground coils 38A are fixed in line along the travelling direction 'a' on the inner surfaces of the inner walls 34A and of the outer walls 36A for levitation and propulsion of the trucks 66A and 68A. Similarly, ground coils 38B are fixed in line along the travelling direction 'a' on the inner surfaces of the inner walls 34B and of the outer walls 36B for levitation and propulsion of the trucks 66B and 68B. The superconductive coils 65 disposed on the trucks 66A and 68A and the ground coils 38A constitute a linear motor 31A; the superconductive coils 65 disposed on the trucks 66B and 68B and the ground coils 38B constitute a linear motor 31B. The linear motors 31A and 31B correspond to the driving device of the flying vehicle-launching apparatus relating to the present invention. Travelling ways 40A and 40B, on which the tires 67 roll when the carrier device 2 travels at a low speed, are constructed of concrete and are provided at the bottom of the L-shaped guide ways 30A and 30B, respectively.

A common railway truck such as a truck of a railway car of a shinkansen train (also known as the Japanese "Bullet Train") can be used as the trucks 66A, 66B, 68A, and 68B. When employing a common railway truck, a common railway can be used in place of the L-shaped guide ways 30A and 30B. Further, the wheels of the trucks 66A, 66B, 68A, and 68B can be rotated by ordinary rotative motors as well as each of the trucks 66A, 66B, 68A, and 68B can also be equipped with a linear motor.

As shown in FIG. 5, the length of the tracks 4 is e.g., 6.8 km and the exhaust gas-discharging interspace 32 is disposed at a section from 2 to 3.5 km from the starting point. A length portion of the exhaust gas-discharging interspace 32 to the tracks 4 and the location thereof can be determined based on what speed the spacecraft 100 is to be accelerated and at what speed the propulsive engine of the spacecraft 100 is ignited.

A launching scheme for launching the spacecraft 100 using the horizontal launching apparatus 1000 is described in the following.

Figure 6:
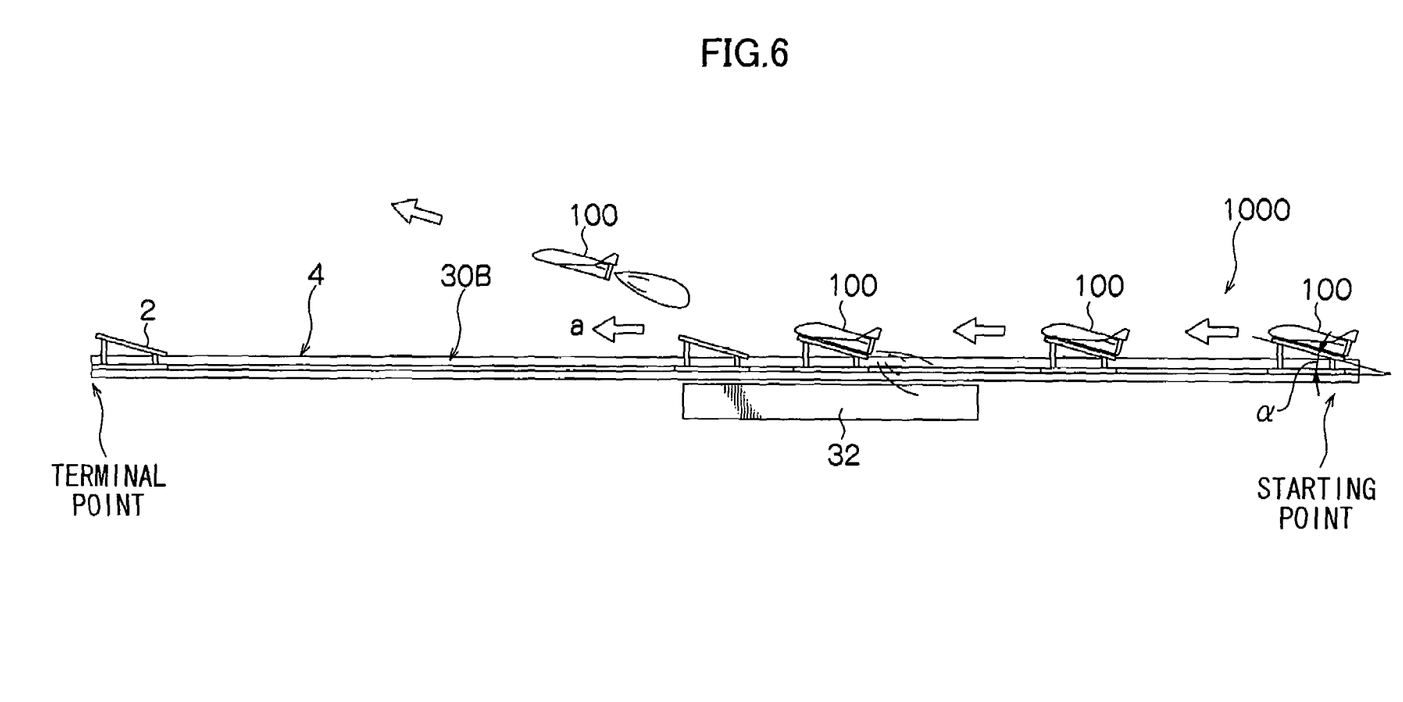
FIG. 6 is a schematic side view showing a launching scheme of a spacecraft in the horizontal launching apparatus of the first embodiment.
Figure 7:
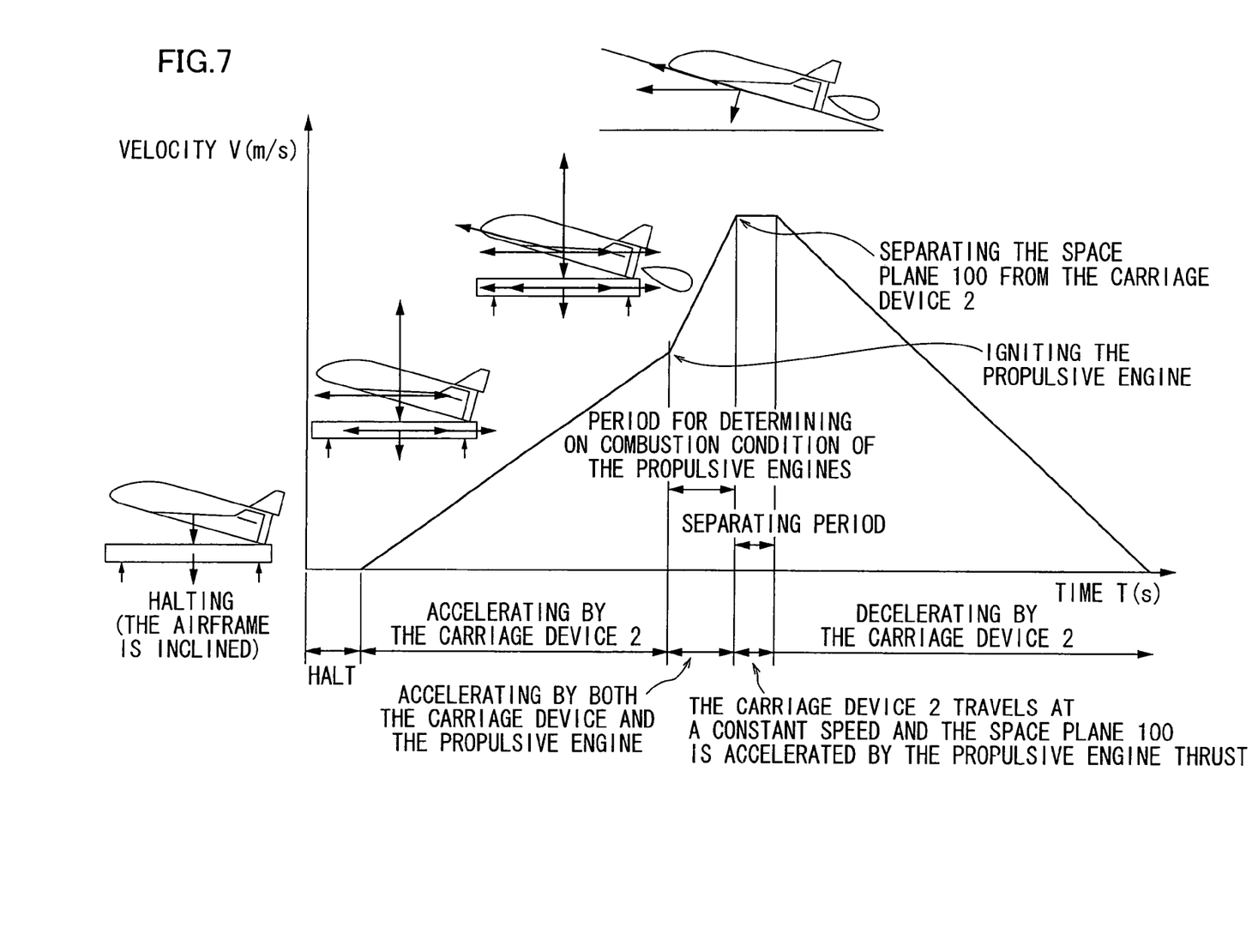
FIG. 7 is a typical run curve of a carrier device in the horizontal launching apparatus of the first embodiment craft.
Figure 8:
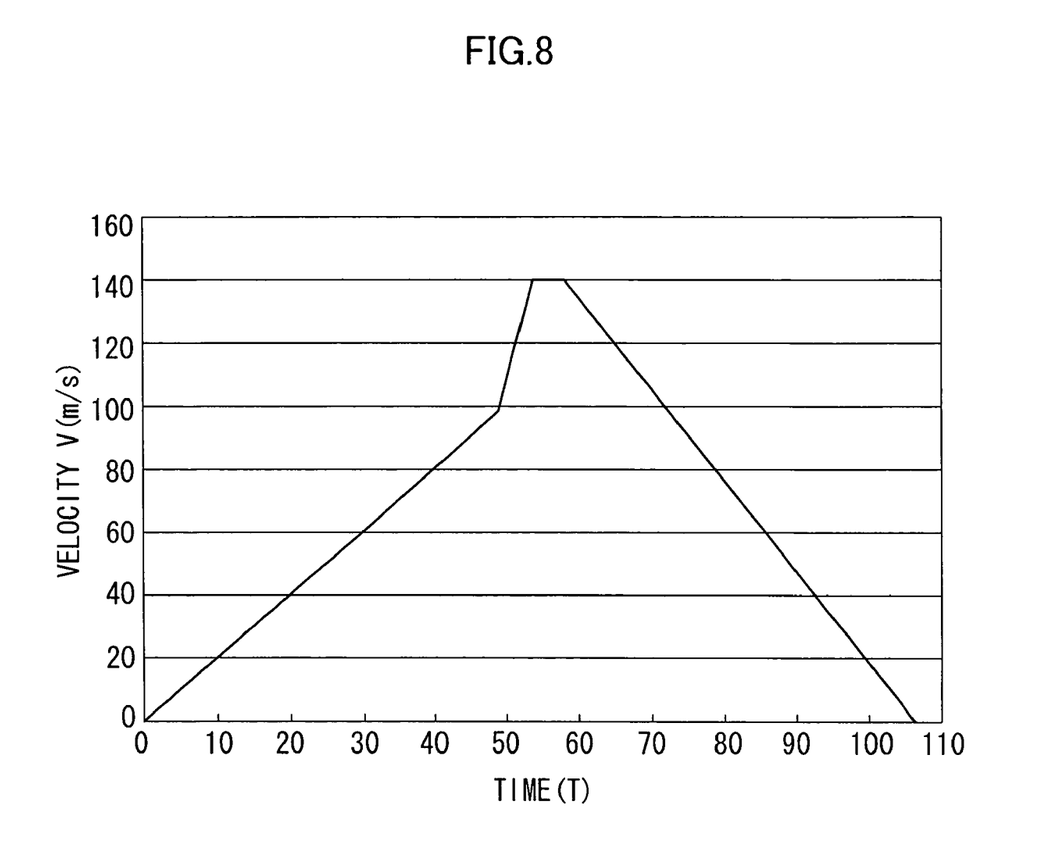
FIG. 8 is a typical run curve of the carrier device of the horizontal launching apparatus of the first embodiment launching a spacecraft.
Figure 9:
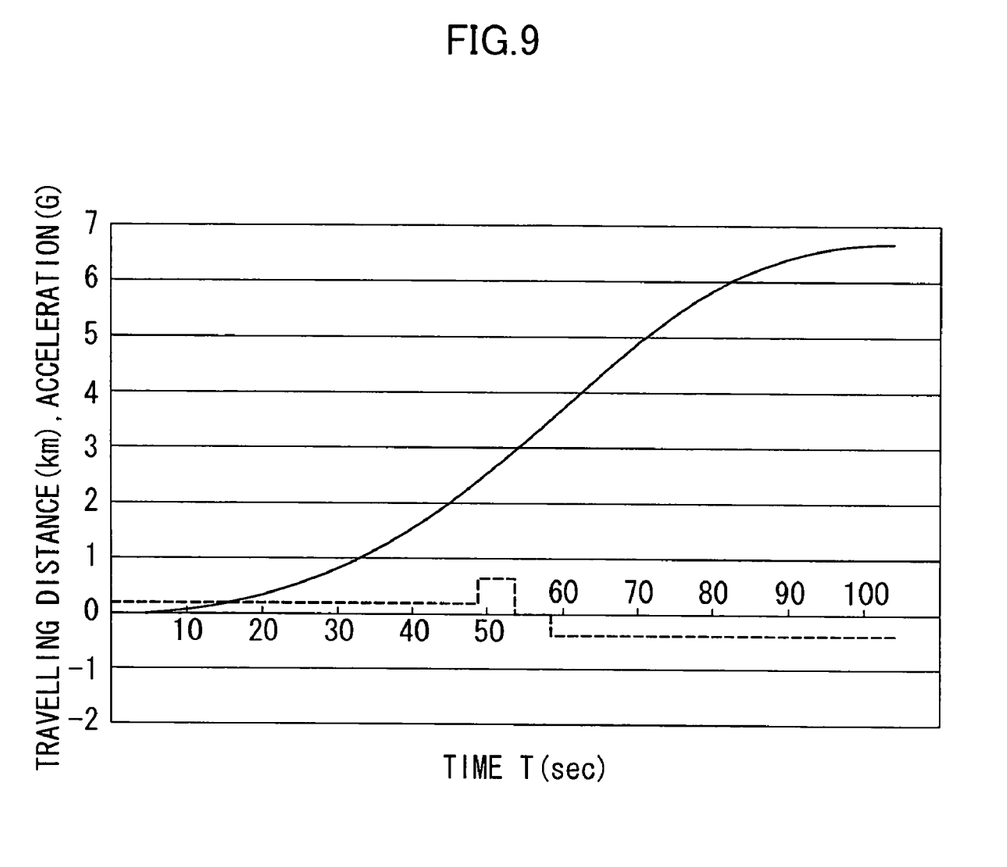
FIG. 9 is a graph showing a relation between traveling distance and acceleration of the carrier device and the time after the initiation of acceleration for the horizontal launching apparatus of the first embodiment.
Figure 10:
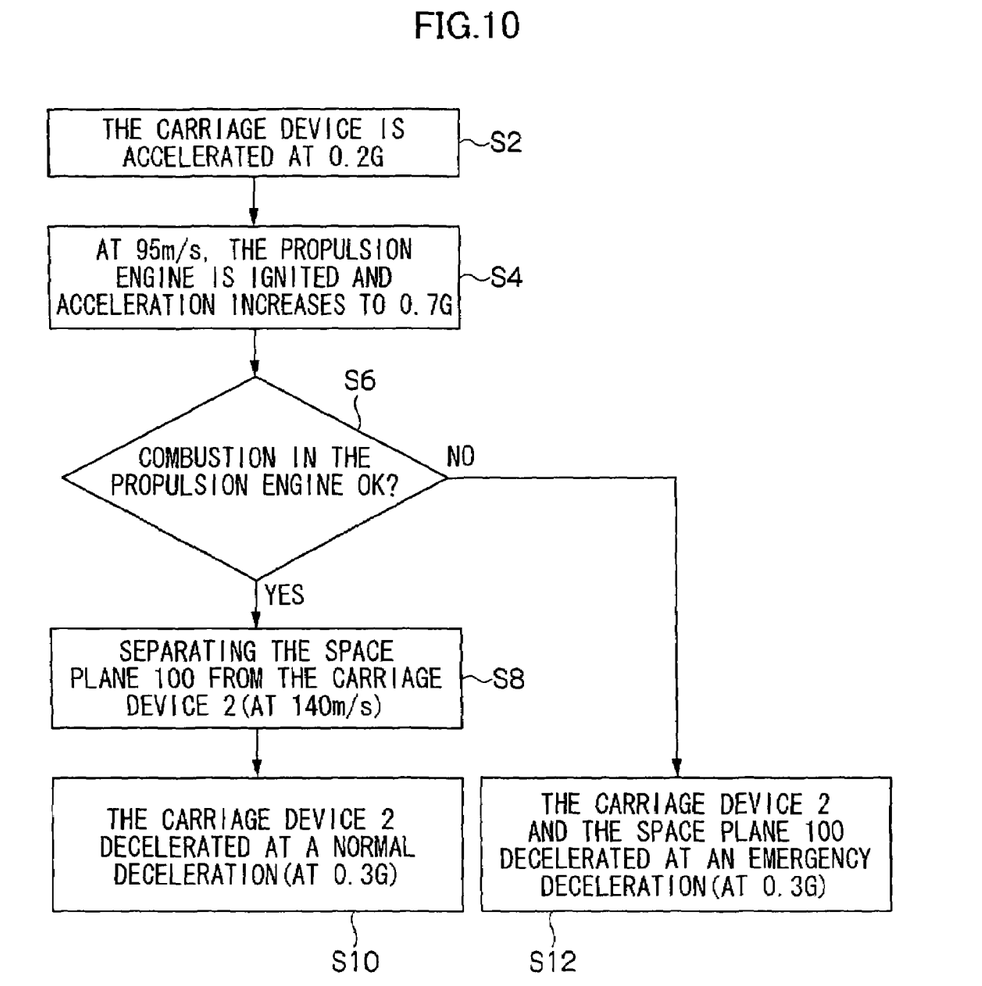
FIG. 10 is a flow chart showing an example of a scheme of launching a spacecraft with the horizontal launching apparatus of the first embodiment.

FIG. 6 shows a schematic procedure of the launching scheme. FIGS. 7 and 8 show a typical run curve of the spacecraft-supporting platform 20 when launching the spacecraft in the above-mentioned launching scheme. FIG. 9 shows the relation between the time T (in seconds), the travelling distance (in km) and the acceleration (in G). FIG. 10 shows a flow chart of the launching scheme.

As shown in FIG. 6, at the starting point, the spacecraft 100 is mounted on the spacecraft-supporting platform 20 and held at a predetermined angle of attack α that is positive against the travelling direction 'a'.

Then, as shown in step S2 in FIG. 10, the ground coils 38A and 38B are energized and acceleration of the carrier device 2 is initiated at an acceleration of 0.2 G by the linear motors 31A and 31B. As shown in FIG. 7, when acceleration is started, the propulsive engine of the spacecraft 100 is not ignited and thus, the spacecraft 100 is accelerated only by the carrier device 2.

As shown in FIGS. 7 to 9, 48.5 seconds later, the carrier device 2 is accelerated to a speed of 95 m/s and then, as shown in step S4 in FIG. 10, the propulsive engine of the spacecraft 100 is ignited. As shown in FIG. 7, ignition timing is arranged so that there is sufficient time to determine whether the propulsive engine is operating normally. After igniting the propulsive engine, acceleration of the spacecraft increases from 0.2 G to 0.7 G and as shown in the run curve in FIGS. 7 and 8, the acceleration of the spacecraft-supporting platform 20 also increases from 0.2 G to 0.7 G by the acceleration by the propulsive engine and the linear motors 31A and 31B. When the propulsive engine is ignited, the spacecraft 100 is travelling in the section of the tracks 4 wherein the exhaust gas-discharging interspace 32 is provided and thus, high-temperature exhaust gas is discharged from the propulsive engine to the exhaust gas-discharging interspace 32. Therefore, damage of the carriage portions 6A and 6B, the frontal struts 22, the rear struts 24, the spacecraft-supporting platform 20, and the ground coils 38A and 38B caused by direct exposure to the high-temperature exhaust gas is prevented.

As shown in step S6 in FIG. 10, after ignition of the propulsive engine, it is determined whether the propulsive engine is operating normally.

If it is determined that the ignition in the propulsive engine is proceeding normally, acceleration is continued and when the carrier device 2 is accelerated to a speed of 140 m/s, the acceleration of the carrier device 2 by the linear motors 31A and 31B is stopped. Thus, as shown by the run curve in FIGS. 7 and 8, the carrier device 2 travels at a constant velocity and in a uniform direction while the spacecraft 100 is accelerated by the thrust of the propulsive engine to a speed of more than 140 m/s. Consequently, as shown in step S8 in FIG. 10, the spacecraft 100 runs on the spacecraft-supporting platform 20 and is released therefrom to be launched in an upward direction.

After the spacecraft 100 is released from the carrier device 2, as shown in step S10 in FIG. 10, the carrier device 2 is slowed to an acceleration rate of 0.3 G by the linear motors 31A and 31B to a halt at a terminal point shown in FIGS. 5 and 6. A prefix '+' added to a number of acceleration means that the acceleration is in the same direction as the travelling direction 'a' while a prefix '−' added to a number of acceleration means that the acceleration is in the direction opposite to the travelling direction 'a'.

On the other hand, if it is determined that the ignition in the propulsive engine is not normally proceeding, the ignition in the propulsive engine is stopped and the spacecraft 100 is slowed down by the linear motors 31A and 31B at an acceleration of −0.3 G while being held on the spacecraft-supporting platform to halt on the tracks 4.

Figure 11A:
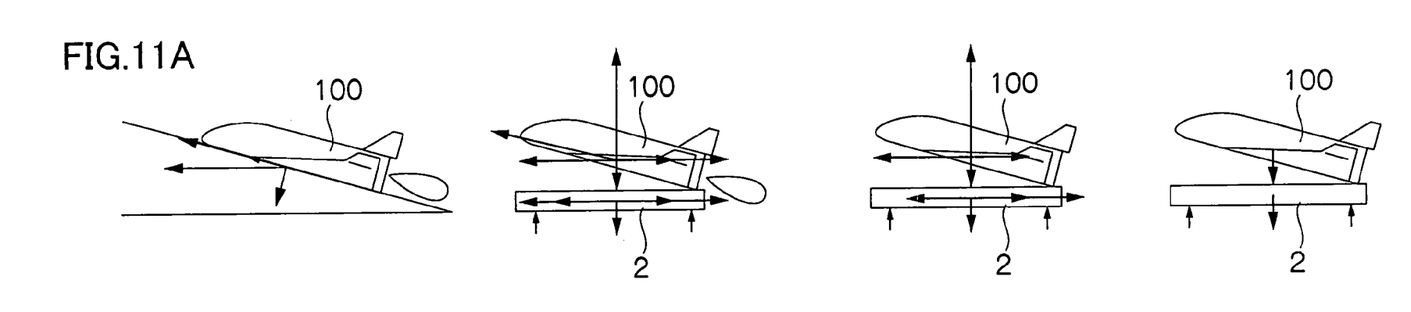
FIGS. 11A to 11C are block diagrams showing certain examples of schemes of launching a spacecraft with the horizontal launching apparatus of the first embodiment.

One example of a scheme for launching the spacecraft 100 by using the horizontal launching apparatus 1000 was described above. When a spacecraft-supporting platform 20 constructed to be retractable is employed, instead of launching the spacecraft in accordance with the first scheme mentioned above and shown in FIG. 11A, the spacecraft 100 can be launched in accordance with a second or a third scheme as shown in FIGS. 11B and 11C.

Figure 11B:
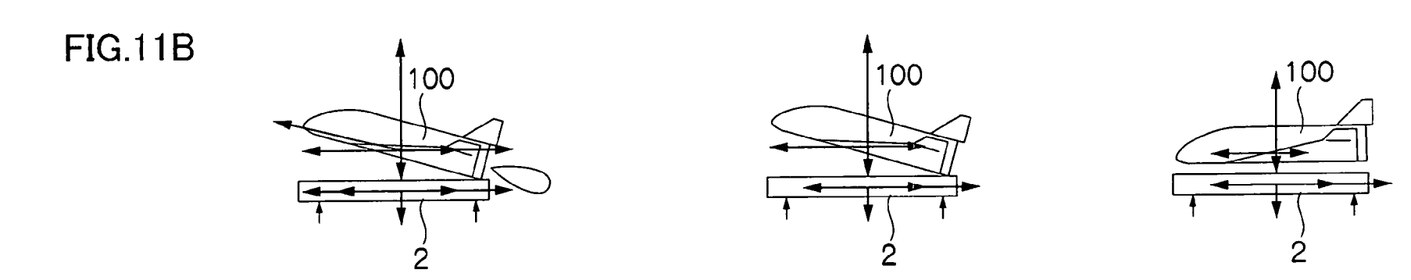
Figure 11C:
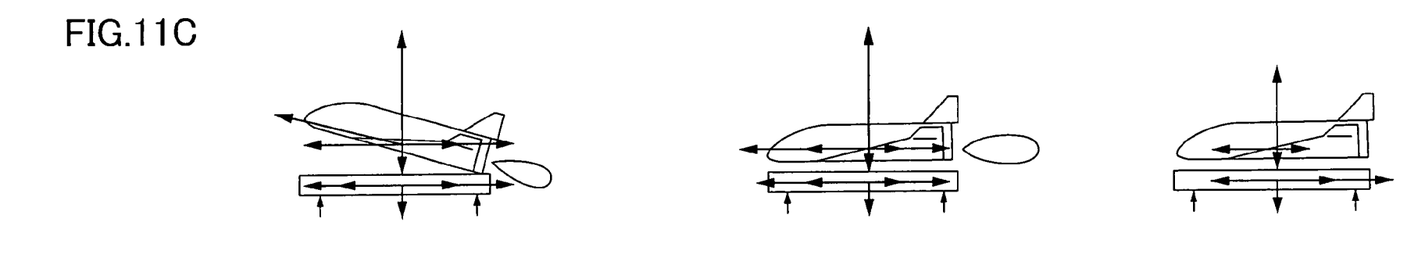

In the second scheme, as shown in FIG. 11B, the spacecraft 100 acceleration is started only by the linear motors 31A and 31B in a horizontal position, then the spacecraft 100 is raised up from the horizontal position to a position making a positive angle of attack of α, and then, the propulsive engine is ignited. In the third scheme, as shown in FIG. 11C, acceleration of the spacecraft 100 is initiated only by the linear motors 31A and 31B, then, the propulsive engine is ignited and then, the spacecraft 100 is raised up from a horizontal position to a position making a positive angle of attack α. By accelerating the spacecraft 100 in accordance with the second or the third scheme, the aerodynamic drag generated when accelerating the spacecraft 100 with the linear motors 31A and 31B is much less than that generated when accelerating in accordance with the first scheme. Thus, assuming that the same amount of electricity is applied, by accelerating in accordance with the second or the third scheme, the spacecraft can be accelerated at a higher rate of acceleration. When the acceleration is the same, a smaller amount of electricity is needed for accelerating the spacecraft 100 at the determined acceleration and therefore, electricity can be saved.

In addition, the center of drag of the spacecraft 100 is so close to the center of drag of the carrier device 2 that the momentum load generated by the difference of the height of the center of drag is small.

In the horizontal launching apparatus 1000 of the first embodiment, as described above, the carrier device 2 on which the spacecraft 100 is mounted is accelerated in a scheme wherein the carrier device 2 is first accelerated by the linear motors 31A and 31B and during acceleration, the propulsive engine of the spacecraft 100 is ignited. Thus, the horizontal launching apparatus 1000 can be easily adapted to unmanned operation and additionally, provides higher safety when an accident occurs such as when the propulsive engine of the spacecraft 100 explodes during acceleration.

Further, by controlling the frequency and current of alternative current supplied to the ground coils 38A and 38B, thrust generated by the linear motors 31A and 31B can be easily controlled. Thus, thrust by the linear motors 31A and 31B can be quite easily controlled so as to follow the deviation of the thrust of the propulsive engine of the spacecraft 100.

Additionally, the linear motors 31A and 31B are usually operated by an inverter and thus, by adding resistance or an electricity-returning system to the inverter, dynamic or regeneration braking can be easily carried out. In addition, by carrying out regeneration braking, the dynamic energy of the carrier device 2 can be returned as electric energy and consequently, operation energy can be saved.

In the horizontal launching device 1000, determination as to whether combustion is being carried out normally in the propulsive engine of the spacecraft 100 is made during acceleration and if combustion is not proceeding normally, the carrier device 2 is slowed to halt. Accordingly, even when a malfunction is detected in the propulsive engine of the spacecraft 100 during acceleration, the spacecraft 100 can be safely retrieved and repaired. For this reason, the horizontal launching apparatus 1000 is also economical.

Unless the yaw direction of the thrust vector of the propulsive engine of the spacecraft 100 supported by the spacecraft-supporting platform 20 is the same as the direction of the thrust of the linear motors 31A and 31B, a yaw direction load is applied to the spacecraft. However, in the horizontal launching apparatus 1000, the carriage portions 6A and 6B are disposed bilaterally beside the spacecraft-supporting platform 20 that supports the spacecraft 100 and thus, the spacecraft-supporting platform 20 is supported by the carriage portions 6A and 6B across the tracks 4 consisting of L-shaped guide ways 30A and 30B. Therefore, the yaw direction load can be held by the carriage portions 6A and 6B and the L-shaped guide way and consequently, the spacecraft can be smoothly accelerated under the yaw direction load.

Additionally, after acceleration, the spacecraft 100 is released from the spacecraft-supporting platform while being held in a positive angle of attack $\alpha$ against the travelling direction 'a' of the carrier device 2. Thus, by moving the carrier device 2 at a constant speed, the spacecraft 100, while continuing acceleration by the thrust of the propulsive engines, runs forwardly on the spacecraft-supporting platform 20 and is released in an upward direction.

Accordingly, it is only necessary to dispose a holding device on the spacecraft-supporting platform 20 for detachably holding the space craft 100 thereon and preventing the spacecraft from falling or slipping off therefrom, and no special releasing device such as a catapult is needed to release the spacecraft 100. Additionally, the spacecraft-supporting platform 20 can be fixed on the carriage portions 6A and 6B so as to slant in a positive angle of attack $\alpha$, and a device such as a hydraulic cylinder for raising the spacecraft-supporting platform to a predetermined angle of attack is not always necessary, thus significantly simplifying the construction of the carriage device.

Since linear motors 31A and 31B are adopted as driving devices driving the carriage portions 6A and 6B of the horizontal launching apparatus 1000, the maximum acceleration is not limited by a coefficient of friction between a wheel and a rail, such as in a common railway system that depends on such friction between the wheel and rail. Consequently, the spacecraft can be accelerated at as high an acceleration as possible, to the limit of the construction strength of the carrier device 2 and the spacecraft 100, and when the spacecraft 100 is manned, the health condition of the flight crew allows. Further, at least when travelling at a high speed, the carriage portions 6A and 6B are supported and guided without contacting the L-shaped guide ways 30A and 30B.

Frontal truck groups 62A and 62B and rear truck groups 64A and 64B are disposed under the carriage portions 6A and 6B along the travelling direction 'a' of the carrier device 2. In addition, the frontal truck group 62A and the rear truck group 64A are supported rotatably in a vertical direction on the bottom of the carriage portion 6A by the pivot 70 at a single point so as to rotate in a vertical direction. As well as the frontal truck group 62B and the rear truck group 64B are supported rotatably in a vertical direction on the bottom of the carriage portion 6B by the pivot 72 at a single point. Thus the frontal truck groups 62A and 62B and rear truck groups 64A and 64B turn around the pivots 70 and 72 to equally hold a momentum load, which is applied to the spacecraft 100 and the carrier device 2 when the center drag of the spacecraft 100 is much higher than the center of drag of the carrier device 2. Consequently, the spacecraft 100 is smoothly accelerated after the propulsive engine of the spacecraft 100 is started.

Additionally, the propulsive engine is ignited after acceleration is initiated by the carrier device 2 and then, before the launch from the carrier device 2, it is determined whether the propulsive engine is operating normally. If the propulsive engine does not operate normally, the carrier device 2 is slowed to a halt while holding the spacecraft 100 mounted thereon. Thus, reliability of launch of the spacecraft 100 greatly improves and it is extremely safe and quite easy to retrieve and repair the spacecraft when its propulsive engine malfunctions.

The flying vehicle-launching apparatus and method of the present invention can be preferably applied to a horizontal launch of a spacecraft. The flying vehicle-launching apparatus and method can be also applied to launch an overloaded jetliner or a supersonic airliner.

What is claimed is:

1. A flying vehicle-launching apparatus that launches a winged flying vehicle by accelerating the winged flying vehicle in a predetermined direction, the apparatus comprising:

a flying vehicle-supporting platform that supports the winged flying vehicle such that the winged flying vehicle can launch therefrom;

two or more guide ways extending in parallel and separated from each other, each guide way comprising a track;

a guide device comprising at least one carriage portion which travels along each track, the at least one carriage portion supporting the flying vehicle-supporting platform over the two or more guide ways and the guide device guiding the flying vehicle-supporting platform along the guide ways; and a driving device that drives the flying vehicle-supporting platform along the guide ways, wherein the driving device drives the at least one carriage portion to drive the flying vehicle supporting platform and comprises a linear motor, the linear motor comprising a stator provided along the tracks and an armature disposed on the at least one carriage portion; and wherein each carriage portion comprises two or more truck groups disposed along the traveling direction of the flying vehicle-launching apparatus, the truck groups being fixed under the respective carriage portion so as to be rotatable around horizontal axes perpendicular to the traveling direction.

2. The flying vehicle-launching apparatus of claim 1, wherein each truck group comprises a plurality of trucks.

3. The flying vehicle-launching apparatus of claim 2, wherein after igniting a propulsive engine of the winged flying vehicle, it is determined whether the propulsive engine is operating normally before releasing the winged flying vehicle from the flying vehicle-supporting platform, and if the propulsive engine is operating normally, the winged flying vehicle is released from the flying vehicle-supporting platform upon reaching a predetermined speed, and if the propulsive engine is not operating normally, the flying vehicle-supporting platform is slowed to a halt with the winged flying vehicle supported thereon.

4. The flying vehicle-launching apparatus of claim 2, wherein after acceleration of the winged flying vehicle is initiated, the propulsive engine of the winged flying vehicle is ignited and the thrust from the driving device is controlled so that the winged flying vehicle is accelerated in accordance with a predetermined acceleration pattern.

5. The flying vehicle-launching apparatus of claim 3, wherein after acceleration of the winged flying vehicle is initiated, the propulsive engine of the winged flying vehicle is ignited and the thrust from the driving device is controlled so that the winged flying vehicle is accelerated in accordance with a predetermined acceleration pattern.

6. The flying vehicle-launching apparatus of claim 2, wherein after ignition of the propulsive engine of the winged flying vehicle, the flying vehicle-supporting platform is accelerated with a thrust of the driving device controlled to be equal to a difference of an acceleration resistance of the winged flying vehicle accelerating in a predetermined acceleration to a thrust of the propulsive engine of the winged flying vehicle.

7. The flying vehicle-launching apparatus of claim 3, wherein after starting the propulsive engine of the winged flying vehicle, the flying vehicle-supporting platform is accelerated with a thrust of the driving device controlled to be equal to a difference of an acceleration resistance of the winged flying vehicle accelerating at a predetermined acceleration and a thrust of the propulsive engine of the winged flying vehicle.

* * * * *